United States Patent
Larsson et al.

(10) Patent No.: US 6,571,489 B2
(45) Date of Patent: Jun. 3, 2003

(54) METHOD AND DEVICE AT A SINGLE CHAMBER AIR DRIER

(75) Inventors: Sven-Olof Larsson, Landskrona (SE); Mats-Örjan Pogen, Billeberga (SE)

(73) Assignee: Haldex Brake Products AB (DE)

( * ) Notice: Subject to any disclaimer, the term of this patent is extended or adjusted under 35 U.S.C. 154(b) by 0 days.

(21) Appl. No.: 09/961,764

(22) Filed: Sep. 24, 2001

(65) Prior Publication Data

US 2002/0112366 A1 Aug. 22, 2002

Related U.S. Application Data

(63) Continuation of application No. PCT/SE00/00588, filed on Mar. 24, 2000.

(30) Foreign Application Priority Data

Mar. 24, 1999 (SE) .................................. 9901071

(51) Int. Cl.$^7$ .............................. F26B 3/00; B01D 53/06
(52) U.S. Cl. .............................. 34/330; 34/527; 34/548; 34/79; 34/80; 34/582; 34/351; 34/473; 96/110; 96/112; 96/113; 96/130; 95/121
(58) Field of Search ........................ 34/527, 540, 548, 34/562, 582, 79, 80, 82, 330, 332, 345, 351, 473; 96/10, 109, 110, 112, 113, 114, 116, 130, 144; 95/91, 117, 121; 303/1, 85

(56) References Cited

U.S. PATENT DOCUMENTS

| | | | | |
|---|---|---|---|---|
| 4,487,617 A | * | 12/1984 | Dienes et al. | 55/163 |
| 4,581,047 A | * | 4/1986 | Larsson | 55/179 |
| 5,027,529 A | * | 7/1991 | Cramer et al. | 34/562 |
| 5,145,495 A | * | 9/1992 | Elamin | 55/162 |
| 5,427,609 A | * | 6/1995 | Zoglman et al. | 95/98 |
| 5,575,541 A | * | 11/1996 | Elamin | 303/1 |
| 5,632,802 A | * | 5/1997 | Grgich et al. | 95/10 |
| 5,715,621 A | * | 2/1998 | Mitsch | 34/527 |
| 5,730,172 A | * | 3/1998 | Rodell et al. | 137/102 |
| 5,961,698 A | * | 10/1999 | Dossaji et al. | 96/130 |
| 6,342,093 B1 | * | 1/2002 | Larsson | 96/397 |
| 6,358,300 B1 | * | 3/2002 | Fornof et al. | 95/91 |

* cited by examiner

*Primary Examiner*—Pamela Wilson
(74) *Attorney, Agent, or Firm*—St. Onge Steward Johnston & Reens LLC

(57) ABSTRACT

For a single chamber air drier in a compressed air system on a vehicle the volume of dry regeneration air required to regenerate a desiccant in the air drier has to be determined. This can be accomplished in that data regarding system pressure, outdoor temperature and supplied air volume are continuously provided to a compute, which in relation to these parameters controls the supply of regeneration air to the air drier.

7 Claims, 1 Drawing Sheet

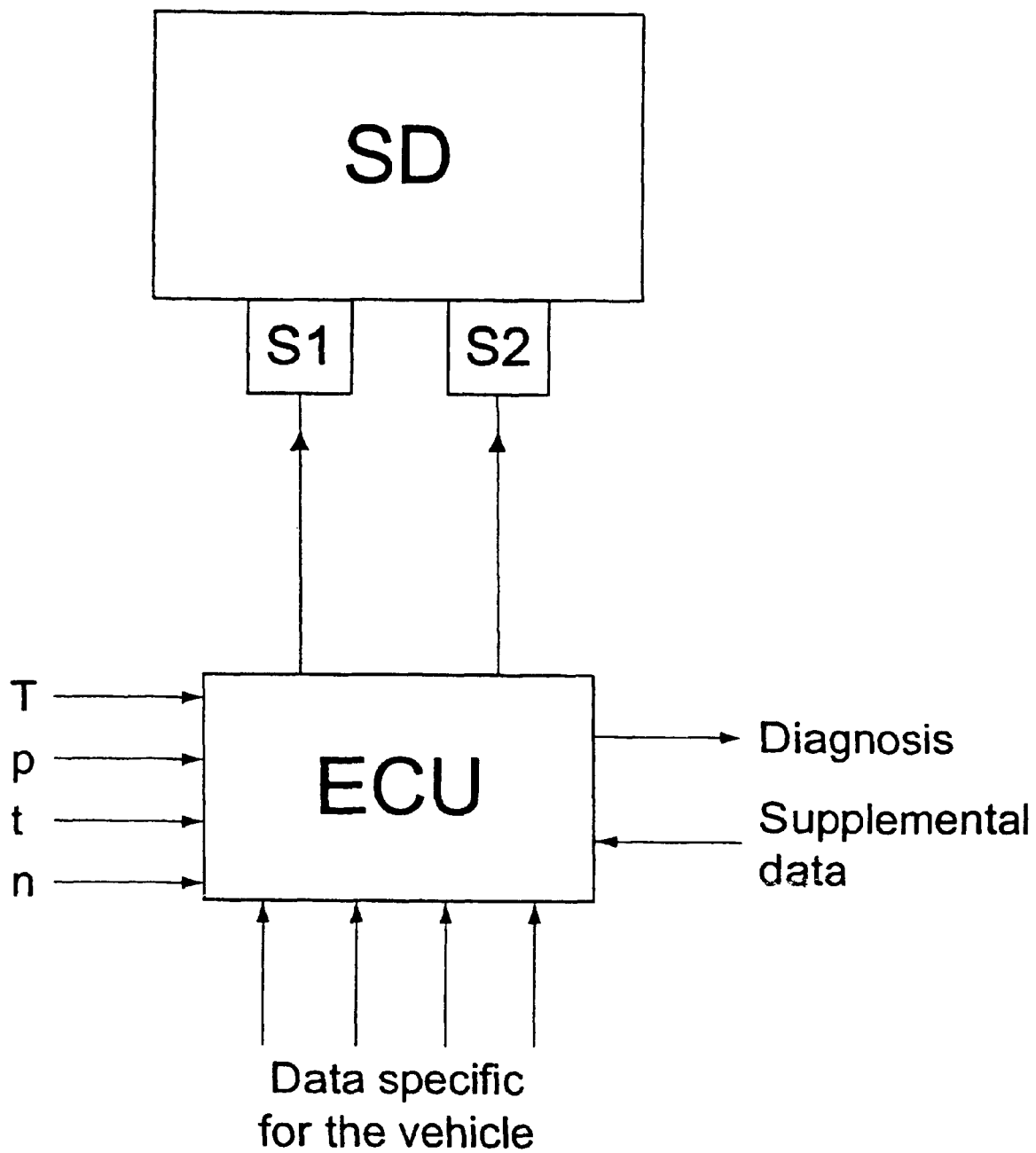

METHOD AND DEVICE AT A SINGLE CHAMBER AIR DRIER

This application is a continuation of pending International Application No. PCT/SE00/00588 filed Mar. 24, 2000, designating the United States and claiming priority of Swedish Application No. 9901071-2 filed Mar. 24, 1999.

TECHNICAL FIELD

The present invention relates to a method and device at a single chamber air drier in a compressed air system for determining the volume of dry regeneration air required to regenerate a desiccant in the air drier.

BACKGROUND OF THE INVENTION

A compressed air system for a vehicle, normally a truck or bus, usually includes an air drier for removing moisture from the air, as the moisture can be detrimental for air consumers in the vehicle, such as brakes, air suspensions, and door openers.

The supplied volume of air in the compressed air system varies depending on the driving conditions and the vehicle type.

Climate conditions also vary considerably and thus the moisture content of the air, which directly influences the air drier.

Further, the compressed air is often contaminated in the compressor by its lubricant, which partly joins the air flow into the compressed air system and gradually deteriorates the desiccant in the air drier.

The conventional way to regenerate the desiccant in a single chamber air drier is to supply a constant volume of dried air from the system, either via a special regeneration tank or via a regeneration valve opening for a fixed time period.

This method implies that the volume of regeneration air has to be over-dimensioned in order to manage the few worst loads on the desiccant with regard to throughput air volume and the moisture content of the air.

The contamination of the desiccant gradually decreases the capacity, so that the drying effect gradually disappears in spite of sufficient regeneration capacity.

The Invention

In a method according to the invention the determination of the required volume of dry regeneration air is achieved in that data regarding system pressure, outdoor temperature and supplied air volume are continuously provided to a computer, which in relation to these parameters controls the supply of regeneration air to the air drier.

A device for carrying out this method has a computer for controlling two solenoids at the air drier, wherein the first solenoid provides a pilot signal to an unloader valve of the air drier and the second solenoid—subordinated to the first solenoid valve—controls the volume of regeneration air supplied to the air drier and wherein the computer is arranged to continuously receive data regarding system pressure, outdoor temperature and supplied air volume.

By substituting the conventional mechanical/pneumatical valves in the air drier and sometimes the regeneration tank for two solenoid valves controlled via an onboard computer, a variable volume of regeneration air can be produced and the influence on the drying function of the system pressure, the temperature, and contaminations can be taken into account for the purpose of making the use of the regeneration air more effective, which leads to an improved drying function, energy saving, lower maintenance, and lower installation costs.

If the air drier has a large capacity, the new control makes it possible to determine the conditions for optimizing the use of the vehicle. This means that the calculated need for regeneration air can be stored in a memory, so that the balance in the air drier can be restored at a suitable time. The normal pressure span can be varied for varying the number of drainages and regenerations, and the wear of the desiccant can be taken into account.

A diagnosis system can also be provided, which gives information when a serious system failure occurs or when the compressed air consumption goes outside limits where dry air can be guaranteed.

THE DRAWING

In the enclosed drawing a very schematic view of a device according to the invention is shown.

DETAILED DESCRIPTION OF EMBODIMENTS

It is well known in the art that compressed air to be used for example for an air brake system in a road vehicle, primarily a truck or bus, should be dried before use. This may be accomplished by means of an air drier installed in the system between an air compressor and an air consumer or a tank for dried air.

Air to be dried is transferred from the compressor through a desiccant (and possibly one or more filters) in the air drier. After a certain service time the desiccant has become moist and has to be regenerated or dried in order to be able to continue its drying function. This regeneration is performed by means of dried air from the system. The present invention is concerned with the control of this regeneration.

In the FIGURE a single chamber air drier SD is schematically depicted. The compressed air system in which this air drier is incorporated is conventional and will not be further described. The regeneration of the air drier SD is controlled by an on-board computer ECU over two solenoids S1 and S2. The first solenoid S1 provides a pilot signal to a conventional unloader valve of the air drier SD for control of a compressed air signal to the compressor or its clutch. The second solenoid S2 controls the volume of regeneration air supplied to the air drier and is subordinated to the first solenoid S1.

Continuous information about outdoor temperature T (in ° C.), system pressure p (in bar), time t (in s), and number of engine or rather compressor revolutions is supplied to the computer ECU.

If the air intake to the compressor is placed after a turbo charger, supplying i a the engine with air, information about the turbo pressure may also be supplied to the computer ECU, because the air flow is dependent on the air consumption of the engine.

Data specific for the vehicle are also supplied to the computer ECU. Such data include certain pressure levels, compressor data, and limits for compressor revolution numbers. These data are preferably only supplied once.

During the lifetime of the vehicle also supplemental data may be supplied to the computer ECU, for example at servicing the vehicle, which may lead to a change of an adjustment factor in the computer, for example if the vehicle is not operated in the precontemplated way.

Additionally, it may be possible to supply to the computer ECU information about speed, fuel supply and the like, so that the utilization of the vehicle becomes optimal.

From the computer ECU a diagnosis signal to other means in the vehicle may be provided, for example regarding system failures, leakage and so forth. In certain cases the diagnosis signal may lead to a visible or audible signal to the driver of the vehicle.

A function for forced regeneration and a function for accumulating incomplete regenerations provide a guarantee for perfectly satisfactory function. A prerequisite for maximum accumulation of regeneration time has been determined.

The following abbreviations are used:

p=continuously measured variable system pressure (bar)
p1=maximum working pressure (bar)
p2=variable cut-in pressure (bar)
p3=nominal cut-in pressure (bar)
a0=atmospheric pressure (normally 1 atm)
at=turbo pressure (atm)
t1=time for S2 (s)
tpott=accumulated, not spent, historical regeneration time (s)
N1=number of compressor revolutions before forced regeneration
N2=number of covered compressor revolutions
N3=accumulated number of covered compressor revolutions
Nnom=predetermined number of compressor revolutions before desiccant exchange
U=constant for compressor capacity (1/rev)
T=outdoor temperature (° C.)
W=adjustment factor, normally=1

The time for activating S2 is determined in the following way:

$$t1 = f(p, N2, U, T, W) + tpott$$

The variable cut-in pressure is determined in the following way:

$$p2 = f(p3, T, N3, Nnom)$$

The number of revolutions to forced regeneration is determined in the following way:

$$N1 = f(p1, T, U)$$

When N3=Nnom a warning signal is issued.

Presently, the following practical relations may be used:

$$t1 = Vreg/Qreg \times C \times W + tpott$$

where Vreg stands for a theoretical need of regeneration air in relation to the volume of dried compressed air $$Vreg = at/aO \times N2 \times U/(p+1);$$
$$Qreg = 8.5 \times p/60;$$

-continued

| | |
|---|---|
| $C = 1 + 0.02T$; | |
| $W = 1$ | (normally) |
| $p2 = p3 + p4 + p5$ | where: |
| $p4 = 0.025T$ | (temperature compensation) |
| $p5 = 0.1 \times N3/Nnom$ | (ageing factor) |
| $p1 - 2.5 < p2 < p1 - 0.8$ | (limitations) |
| $N1 = 1/U \times Qreg \times (p+1) \times 20 \times C$ | |
| $Qreg \times (p+1) \times 20$ = maximum volume during maximum normal load cycle of 20 s of undried air from the compressor. | |

What is claimed is:

1. A method at a single chamber air drier in a compressed air system for determining the volume of dry regeneration air required to regenerate a desiccant in the air drier, characterized in that data regarding system pressure, outdoor temperature and supplied air volume are continuously provided to a computer, which in relation to these parameters controls the supply of regeneration air to the air drier.

2. A method according to claim 1, characterized in that a variable cut-in pressure is determined as a function of a nominal cut-in pressure, of the outdoor temperature and of the ageing of the desiccant in the air drier.

3. A method according to claim 2, characterized in that the ageing of the desiccant is determined by the accumulated number of compressor revolutions in relation to a predetermined number of compressor revolutions before desiccant exchange.

4. A method according to claim 1, characterized in that the number of compressor revolutions before forced regeneration is determined as a function of maximum working pressure, of outdoor temperature and of compressor capacity in volume per revolution.

5. A device for carrying out the method of claim 1, characterized by a computer for controlling a first and a second solenoids at the air drier, wherein the first solenoid provides a pilot signal to an unloader valve of the air drier and the second solenoid—subordinated to the first solenoid—controls the volume of regeneration air supplied to the air drier and wherein the computer is arranged to continuously receiver data regarding system pressure, outdoor temperature and supplied air volume.

6. A method at a single chamber air drier in a compressed air system for determining the volume of dry regeneration air required to regenerate a desiccant in the air drier, characterized in that data regarding system pressure, outdoor temperature and supplied air volume are continuously provided to a computer, which in relation to these parameters controls the supply of regeneration air to the air drier, wherein the regeneration time is determined as a function of the system pressure, of the outdoor temperature, of the volume of air supplied by the compressor and of a constant adjustment factor plus an accumulated historical regeneration time.

7. A method according to claim 6, characterized in that the volume of air supplied by the compressor is the number of compressor revolutions times the compressor capacity expressed in volume/revolution.

* * * * *